(12) United States Patent
Burk et al.

(10) Patent No.: US 10,919,171 B2
(45) Date of Patent: Feb. 16, 2021

(54) CONTAMINATION PROTECTION DURING TRANSPORT OF FOOD PORTIONS

(71) Applicant: WEBER MASCHINENBAU GMBH BREIDENBACH, Breidenbach (DE)

(72) Inventors: Alexander Burk, Dautphetal (DE); Christoph Eckhardt, Breidenbach (DE); Jochen Gerlach, Dautphetal (DE); Marco Nichau, Bad Laasphe (DE); Thomas Nispel, Dautphetal (DE); Ingo Rother, Breidenbach (DE); Leopold Von Keudell, Salem (DE); Steffen Zecher, Staufenberg (DE)

(73) Assignee: Weber Maschinenbau GmbH Breidenbach

( * ) Notice: Subject to any disclaimer, the term of this patent is extended or adjusted under 35 U.S.C. 154(b) by 504 days.

(21) Appl. No.: 15/534,471

(22) PCT Filed: Dec. 15, 2015

(86) PCT No.: PCT/EP2015/079878
§ 371 (c)(1),
(2) Date: Jun. 8, 2017

(87) PCT Pub. No.: WO2016/096910
PCT Pub. Date: Jun. 23, 2016

(65) Prior Publication Data
US 2017/0341255 A1    Nov. 30, 2017

(30) Foreign Application Priority Data

Dec. 18, 2014 (DE) .......................... 10 2014 118 965

(51) Int. Cl.
*B26D 7/22* (2006.01)
*B26D 7/18* (2006.01)
(Continued)

(52) U.S. Cl.
CPC .......... *B26D 7/225* (2013.01); *A22C 17/0093* (2013.01); *A22C 17/08* (2013.01);
(Continued)

(58) Field of Classification Search
CPC .......... B65G 47/38; B65G 54/02; B26D 7/32; B26D 7/225; B26D 7/0625; B26D 5/00;
(Continued)

(56) References Cited

U.S. PATENT DOCUMENTS 3,991,685 A    11/1976 Toby
6,009,992 A    1/2000 Erceg et al.
(Continued)

FOREIGN PATENT DOCUMENTS

DE    7430474 U    12/1974
DE    2548489 A1    8/1976
(Continued)

OTHER PUBLICATIONS

Official Communication from the European Patent Office for related EP Application No. 15813030.2; dated: Aug. 2, 2018; 1 page.
(Continued)

*Primary Examiner* — James R Bidwell
(74) *Attorney, Agent, or Firm* — Dickinson Wright, PLLC

(57) ABSTRACT

The invention relates to a device for moving portions each comprising at least one slice separated from a food product, in particular by a slicing device, in particular by a high-speed slicer, having a plurality of individually movable transport movers for transporting portions, having a track system for the transport movers, in which the transport movers can be moved along at least one specified track in a transport direction and having a control device for controlling the movements of the transport movers in the track system, wherein the transport movers each comprise at least one runner cooperating with the track system and at least one
(Continued)

Figure 1:
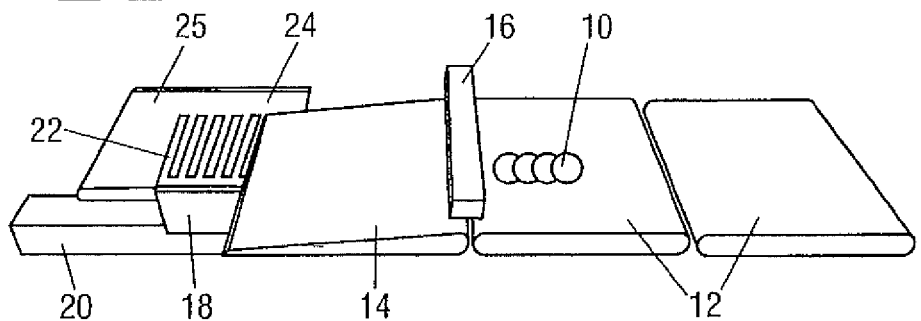

portion carrier mounted on the runner, wherein for at least one sub-section of the track, in particular a section at risk of contamination, a discharge device is provided which is designed to at least intermittently discharge next to the section, contamination and/or incorrect portions originating from the foods, in particular occurring when cutting the food products and/or during handling of the portions.

16 Claims, 8 Drawing Sheets

(51) Int. Cl.
| | |
|---|---|
| *B65G 54/02* | (2006.01) |
| *B65B 25/06* | (2006.01) |
| *B26D 7/32* | (2006.01) |
| *B65B 35/50* | (2006.01) |
| *A22C 17/00* | (2006.01) |
| *A22C 17/08* | (2006.01) |
| *B65B 35/46* | (2006.01) |
| *B65B 35/24* | (2006.01) |
| *B65B 35/44* | (2006.01) |
| *B65B 35/26* | (2006.01) |
| *B65B 43/52* | (2006.01) |
| *B65B 43/56* | (2006.01) |
| *A23B 4/00* | (2006.01) |
| *B26D 7/06* | (2006.01) |
| *B26D 7/08* | (2006.01) |
| *B26D 5/00* | (2006.01) |

(52) U.S. Cl.
CPC ............ *A23B 4/002* (2013.01); *B26D 7/0625* (2013.01); *B26D 7/088* (2013.01); *B26D 7/18* (2013.01); *B26D 7/32* (2013.01); *B65B 25/06* (2013.01); *B65B 35/24* (2013.01); *B65B 35/26* (2013.01); *B65B 35/44* (2013.01); *B65B 35/46* (2013.01); *B65B 43/52* (2013.01); *B65B 43/56* (2013.01); *B65G 54/02* (2013.01); *A23B 4/00* (2013.01); *B26D 5/00* (2013.01); *B26D 2210/08* (2013.01); *B65B 35/50* (2013.01); *B65B 2220/14* (2013.01)

(58) Field of Classification Search
CPC ...... B26D 2210/08; B26D 7/18; B26D 7/088; A22C 17/00; A22C 17/0093; A22C 17/08; B65B 25/06; B65B 35/24; B65B 35/26; B65B 35/44; B65B 43/56; B65B 43/52; B65B 35/46; A23B 4/002; A23B 4/00

See application file for complete search history.

(56) References Cited

U.S. PATENT DOCUMENTS

| | | | | |
|---|---|---|---|---|
| 6,711,877 | B2 * | 3/2004 | Zschoche | ............... B65B 5/08 141/167 |
| 7,134,258 | B2 * | 11/2006 | Kalany | ............... B65B 35/24 53/473 |
| 2009/0120256 | A1 * | 5/2009 | Pasek | ............... B26D 7/18 83/446 |
| 2011/0108392 | A1 | 5/2011 | Polling | |
| 2015/0197353 | A1 * | 7/2015 | Bergmann | ............... B26D 7/32 53/445 |

FOREIGN PATENT DOCUMENTS

| | | |
|---|---|---|
| DE | 3711688 A1 | 10/1988 |
| DE | 19914707 A1 | 5/2000 |
| DE | 202008009280 U1 | 10/2008 |
| DE | 102007047000 A1 | 4/2009 |
| DE | 102008018078 C5 | 10/2009 |
| DE | 202010001065 U1 | 6/2010 |
| EP | 0496046 A1 | 7/1992 |
| EP | 1123886 A1 | 8/2001 |
| EP | 1530541 A1 | 5/2005 |
| EP | 2746165 A1 | 6/2014 |
| JP | H0551087 A | 3/1993 |
| JP | 2014024665 A | 2/2014 |
| WO | 03029651 A2 | 4/2003 |
| WO | 03047977 A2 | 6/2003 |
| WO | 2010085670 A1 | 7/2010 |
| WO | 2016096910 A1 | 6/2016 |

OTHER PUBLICATIONS

German Search Report; International Application No. PCT/EP2015079878; International dated Feb. 2, 2016; International Filing Date: Dec. 15, 2015, 2 pages.
International Preliminary Report on Patentability; International Application No. PCT/EP2015/079878; International Filing Date: Dec. 15, 2015; Priority Date: Dec. 18, 2014, 8 pages.
International search Report: International No. PCT/EP2015/079878; International Filing Date: Dec. 15, 2015, 4 pages.

* cited by examiner

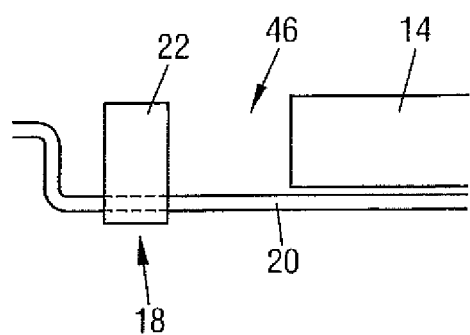
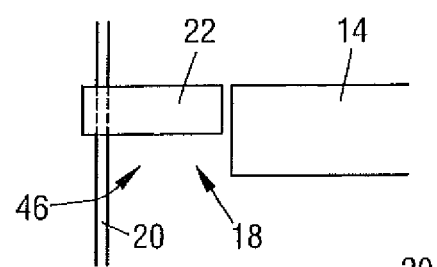
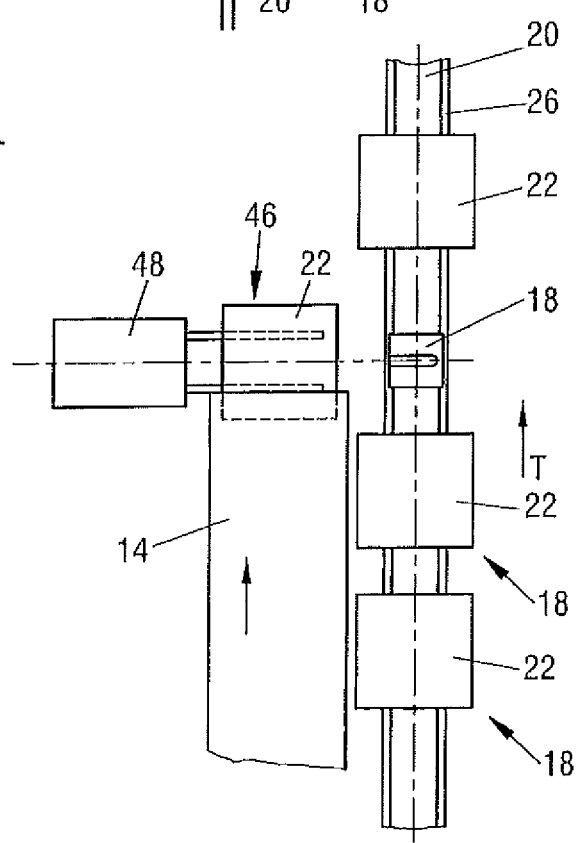

CONTAMINATION PROTECTION DURING TRANSPORT OF FOOD PORTIONS

CROSS-REFERENCES TO RELATED APPLICATIONS

This patent application is a 371 of International Application No. PCT/EP2015/079878, filed Dec. 15, 2015 which claims the priority of German Application No. 102014118965.5, filed Dec. 18, 2014, each of which are incorporated herein by reference in their entirety.

The invention relates to an apparatus for moving portions that respectively comprise at least one slice cut off from a food product, in particular from sausage, cheese, ham, meat or the like. The slices can in particular be cut off by means of a slicing apparatus, preferably by means of a high-speed slicer.

The apparatus comprises a plurality of individually movable transport movers for the transport of portions, a path system for the transport movers in which the transport movers are movable along at least one predefined path in a transport direction, and a control device for controlling the movement of the transport movers in the path system. The transport movers each comprise at least one rotor cooperating with the path system and at least one carrier for portions attached to the rotor. The carrier can be configured as a tray of a packaging or can comprise a tray of a packaging. Alternatively, the carrier can also pick up a tray or can pick up portions directly i.e. without a tray. The drive for the transport movers can, for example, be configured as a linear motor, in particular as a linear synchronous motor or as a linear induction motor.

Such linear motors are generally known in connection with a plurality of applications. Such a drive principle is inter alia advantageous when comparatively small loads are to be transported such as is the case in the sector of the transport of food products in question here.

A transport system which can generally be used for the invention and to which reference will explicitly made with respect to the requirement of performability of the invention is offered by the company MagneMotion, Inc., domiciled in Devens, Mass., USA. This system is based on a so-called LSM drive, that is on a drive by linear synchronous motors which is to be distinguished from a so-called linear induction motor (LIM drive). Unlike an LIM drive, in an LSM drive, a magnetic field is not induced by means of the so-called electromagnetic traveling field, but the magnetic field is provided by permanent magnets. When the rotor of the linear motor carries the permanent magnets and the stator of the linear motor generates the electromagnetic traveling field, the drive principle of an LSM drive can be figuratively imagined such that the transport mover provided with the permanent magnet is pulled over the transport line by the magnetic field moving along the stator. Such a transport system or drive principle is described, for example, in WO 2003/029651 A2 and WO 2010/085670 A1. Reference is herewith explicitly made to these documents with reference to the disclosure of a possible drive principle or function principle for the invention.

The path system or the individual paths of such a transport system can be divided into a plurality of consecutive path elements which so-to-say each form a single linear motor and can be individually controlled by a control device. If the transport movers located in the path system can be identified simultaneously by means of the control device, generally any desired number of transport movers can then in this manner be operated simultaneously in a path system of generally any desired complexity and can be individually moved in this respect.

The above-mentioned company MagneMotion, Inc. uses a technique for the identification and localization of the individual transporters in the path system in which each transporter mover is provided with a transducer which induces a signal in the stator formed by the path system, whereby it makes it possible for the control device to determine the exact position of the transporter with an accuracy dependent on the size of the total system of fractions of a millimeter or fractions of a centimeter. An advantage of this system comprises no external sensors being required. In the control system of the company MagneMotion, Inc., it is additionally ensured by a division of the paths into a plurality of path elements—which so-to-say each represent a single linear motor—that no collisions occur between consecutive transporter movers. A transport mover can thus only travel into the next path element when it is permitted by the control device, which is in particular not the case when another transport mover is located in the path element.

Against the background of this generally known transport system, provision is made in a possible embodiment in the invention that the path system is configured as a stator of the linear motor.

The rotor is in particular a respective component of a linear synchronous motor, with the rotor in particular comprising at least one permanent magnet and the path system being configured as a motor stator.

The path system is preferably divided into a plurality of path elements which in particular each represent a single linear motor and which are individually controllable by the control device.

The transport movers are preferably identifiable by the control device.

The transport movers can furthermore be localized in the path system by the control device.

The transport system has a plurality of transport movers whose total number depends on the respective application. Provision can be made that the path system comprises several dozen up to some hundred transport movers, i.e. a positive "cluster" of transport movers can be present in the path system to transport a plurality of portions and optionally to carry out additional functions such as a buffering, a distribution and/or an association of portions.

Previous path systems are comparatively sensitive to contamination. Cutting residues or cutting waste that arise during slicing or possibly during the handling of the portions in the path system can thus move to the path, for example. Cutting residues or cutting waste that are located on the path possibly represent a hygienic risk. The path can furthermore be clogged with deposits and can thus restrict the freedom of movement of the transport movers on the path. In addition to contaminants, incorrect portions are also unwanted that do not correspond to the desired condition with respect to weight, to the number of slices and/or to the placement pattern. Incorrect portions have previously only been able to be removed from the path system, if at all, in a complex and/or expensive manner, e.g. with the aid of robot grippers. However, where possible, only good portions are already wanted in these transfer regions and, where possible, only complete format sets are wanted for the packaging machine arranged downstream to avoid empty packages.

It is therefore an object of the invention to improve a movement apparatus such that contaminants and/or incorrect portions can be removed from a region of the path in a simple manner.

This object is satisfied by an apparatus and by a method respectively having the features of the respective independent claims.

In accordance with the invention, a disposal device is provided for a part region of the path and is configured to dispose of contaminants and/or incorrect portions originating from the foods, in particular arising on the slicing of the food products, and/or on the handling of the portions next to the part region at least at times.

The term "portion" is to be understood as broad within the framework of the invention. A portion can accordingly consist of only one single slice. Alternatively, a portion can comprise a plurality of slices which can be present in a relative arrangement of generally any form, for example in a so-called stacked or overlapping arrangement such as is familiar to the skilled person in the technical field in question here. The portion can be a total portion such as is subsequently packaged and offered for sale on the market. Alternatively, the portion can be a part portion which also forms a total portion together with one or more further part portions which can in turn each comprise one or more slices. The part portions of a total portion can be formed from different product sorts so that a multi-sort portion can be produced by assembling a plurality of part portions and so that a multi-sort pack is thus present after its packaging. The slices can, for example, be comparatively thin slices such as are generally known in the form of assorted slices of sausage or of cheese. Alternatively, the slices can each be pieces that are relatively thick in comparison with assorted slices such as pieces of fresh meat.

In other words, a portion within the framework of the invention is the unit which is the smallest with respect to the transport task, which has to be transported over a specific line, on the one hand, and which optionally—depending on the application—additionally has to be put into relation with further portions, on the other hand, to satisfy the respective demands of the total system which comprises one or more slicing apparatus, in particular slicers, the path system, and one or more packaging apparatus. For example, with respect to the forming of formats such as have to be provided for the respective provided packaging apparatus.

A transport mover can transport one or more portions. It is alternatively also possible that a plurality of transport movers, in particular two transport movers, transport a portion together. The transport movers can in this respect so-to-say be moved together as a unit on the path system. In this manner, larger loads, in particular heavier portions and/or portions larger in area, can also be moved on the path system than with only one transport mover.

The part region of the path can in particular be a region at risk of contamination. The transport movers can thus, for example, be guided with the help of a guide of the path system. This guide can comprise a rail system that can in particular have a pair of rails. These rails can form a region at risk of contamination. A cleaning of these rails is typically difficult so that a contamination should be prevented in advance in the ideal case.

The transition region between a conventional belt conveyor system and a path system can also be considered a part region at risk of contamination, for example. In this respect, contaminants can fall from the conveyor belt onto the path. If a slice is cut onto the transport movers directly by the slicing apparatus, the part region of the path located in the region of the slicing apparatus is also at risk of contamination. A transition region between the transport movers and a packaging apparatus can also be considered a part region at risk of contamination. Released product residues can move to the path there if, for example, portions are grasped on the transport movers with the aid of a robot gripper and are transferred to a packaging apparatus.

A disposal device is provided for at least these part regions to dispose of contaminants, for example cutting residues and/or cutting waste, and/or incorrect portions next to the part portion at least at times or temporarily. An incorrect portion can in particular represent a portion having an incorrect weight, i.e. the weight of the part portion that can be determined with the aid of a weighing device differs from a desired weight. Furthermore portions having an insufficient quality, e.g. having too high a fat content, foreign body inclusions, a defective structure, in particular a density distribution, or a contour, in particular a non-uniform shape, are also to be included in the term "incorrect portion". As a rule, these deficiencies are only detected after the slicing apparatus, i.e. after the portioning.

The portion transport is in particular not impeded by the disposal device. The transport movers can thus move freely on the path system despite the disposal device.

The disposal device is in particular not formed by a transport mover itself, i.e. the disposal device itself does not move in the path system. The disposal device is preferably substantially located outside the path, but extends into the path region.

Contaminants and/or incorrect portions are disposed of in accordance with the invention next to the part region of the path such that a high hygienic standard, but also good operational safety is achieved. Part regions of the path sensitive to contamination thus above all do not come into contacts with foods. The path system can in particular be protected or encapsulated by the disposal device such that high hygienic standards can be satisfied and strict standards observed even under conditions that are extremely demanding under hygiene aspects such as prevail in the processing of food products and in the cleaning demands associated therewith. It is in particular possible in accordance with the invention to implement an IP69K capable transport system at an acceptable cost.

The uncontrolled dragging of product residues into the path system is furthermore avoided in accordance with the invention.

Further developments of the invention can also be seen from the dependent claims, the description and the enclosed drawings.

In accordance with an embodiment, the disposal device is provided in a transfer region in which portions move onto the transport movers. This transfer region is at particular risk of contamination. It should in particular already be prevented in this transfer region that contaminants, for example cutting residues or cutting waste, or incorrect portions, i.e. portions that are to be separated out, move into the path system, for example onto the transport movers or onto a part region of the path.

In accordance with a further embodiment, the portions are transferred in the transfer region from an insertion apparatus, in particular configured as a conveyor belt, or from a slicing apparatus to the transport movers. The transfer region can thus in particular form an interface between a conveyor belt and a path system. It is also conceivable that the slices are cut onto the transport movers directly by the slicing apparatus or by the cutting blade, i.e. the transfer region is the slicing region in this case. The transport movers can in this respect take over the function of a conventional portioning belt. A conventional portioning belt can in particular remove cutting residues or incorrect portions from the belt conveyor system. In the path system, the disposal device now takes over this function.

In accordance with a further embodiment, the disposal device comprises a disposal apparatus, that is provided in addition to the path and that is arranged above the part region of the path at least at times. The disposal device can in particular be configured as a separate component. The disposal apparatus can in particular be permanently present or can only be pivoted inward at times. If the disposal device is permanently present or pivoted inward, there is a disposal plane in which the disposal device is disposed and a transfer plane which is located thereabove and in which the carriers run. The disposal device is preferably arranged beneath the transfer plane for the portion handling.

In accordance with a further embodiment, the transport movers each comprise a holder for their carrier, the holder engaging around the disposal device such that the carrier is arranged above the disposal device. Consequently, it is preferably possible to work in two different planes. Contaminants and/or incorrect portions that move in the direction of the path are disposed of by the disposal device in a lower plane. If, in contrast, portions are transported to the path, they can be picked up in an upper plane with the aid of the carriers. The holder with the carrier is in this respect U-shaped or L-shaped. The disposal device can thus be bypassed with the aid of the holder. The carrier can thus in particular always be located above the disposal device.

In accordance with a further embodiment, the carrier is formed in grid shape. The term "grid-shaped" is to have a broad interpretation. A rake and/or a plurality of parallel bars or fins are thus also covered, for example. The individual elements of the grid or of the rake are in particular only connected to one another at one side and protrude freely at the other side. I.e. in particular a fork-like structure is present. Due to the grid-like configuration of the carrier, portions located thereon can be removed with the aid of a gripper likewise comprising a grid or a rake. The portion location can also be corrected on the engaging beneath of the carrier in that the gripper e.g. only engages up to a specific portion. The portions can in particular be combed obliquely upwardly by a belt. The holder is preferably configured as areal and continuous beneath the grid such that contaminants falling from the grid onto the holder are collected and do not move onto the path. An oblique design of this surface of the holder additionally facilitates the contamination repelling toward one side.

In accordance with a further embodiment, the disposal apparatus is configured for an active disposal of the contaminants and/or incorrect portions. The disposal apparatus can in particular be movable. The disposal apparatus can preferably have its own drive. Alternatively, the drive can also be derived, for example from a drive for a belt conveyor system. Contaminants and/or incorrect portions can be directly expelled and transported to a predefined location by the active disposal. A collection container for the cutting residues or an apparatus for correcting, in particular completing, the incorrect or incomplete portions can be arranged at this location. The contaminants and/or incorrect portions can in particular be directly expelled in this manner.

In accordance with a further embodiment, the disposal apparatus is configured to dispose of the contaminants and/or incorrect portions laterally next to the part region of the path with respect to the transport direction. The contaminants and/or incorrect portions thus move laterally next to a part region of the path that is in particular sensitive to contamination and do not fall onto the part region. Collection containers or conveyor belts can, for example, be provided laterally next to the path that collect the contaminants disposed of and/or incorrect portions and that conduct them to a collection container, e.g. to a waste container, or to a device for further processing, e.g. for portion completion.

The disposal apparatus can in particular be oriented at a right angle or obliquely to the transport direction such that the contaminants and/or incorrect portions are in particular disposed of at a right angle or obliquely to the transport direction. It is alternatively also possible that the disposal apparatus is at least substantially oriented in parallel with the transport direction. Contaminants and/or incorrect portions can in this respect preferably be disposed of against or in the transport direction, for example upwardly or downwardly into a plane further remote from the path, with a parallel offset from the path extent.

In accordance with a further embodiment, the disposal apparatus comprises a conveying apparatus, preferably a conveyor belt, wherein in particular the conveying device of the conveyor belt extends at a right angle or obliquely to the transport direction. A conveyor belt is in particular inexpensive. Nor are any special demands made on the conveyor belt so that conventional conveyor belts can also be used. The conveyor belt can also in particular be arranged in parallel with the transport direction. A right-angled or oblique arrangement has the advantage that the contaminants and/or incorrect portions are removed as fast as possible from the part region of the path, whereas with a parallel arrangement the contaminants and/or incorrect portions are transported over a somewhat longer section above the path. The path can describe a curve in this case so that the contaminants and/or incorrect portions can e.g. be led on and disposed of straight ahead. The conveyor belt can in particular be configured as pivotable and can only dispose of contaminants and/or incorrect portions at times.

In accordance with an embodiment of the invention, the conveying apparatus comprises a conveyor belt that extends at a right angle or obliquely to the transport direction and through a gap that is present between the path and the rotor in transport operation, in particular between a lower side of the rotor and the upper side of a motor housing of the path system. The motor housing can, for example, be a housing that includes the stator of a linear synchronous motor such as was described in the introductory part.

In this embodiment, the gap anyway present is used to lead a conveyor belt serving for the disposal of contaminants through the apparatus on a level beneath the transport movers. Such a conveyor belt can be sufficiently thin to be led through the gap. The guidance of the conveyor belt can take by generally any desired number of deflection rollers having generally any desired size by which the extent of the conveyor belt, that in particular runs around continuously, can be selected in accordance with the respective construction circumstances. At least one of the deflection rollers can serve as a drive roller for the conveyor belt.

In accordance with a further embodiment, the disposal apparatus comprises a movable cover. The cover can in particular move to and fro at a right angle to the transport direction or can be rotatable.

In accordance with a further embodiment, the cover is areal and/or disk-shaped. The cover is thus in particular configured as a rotatable disk that conveys contaminants by a rotational movement from the part region of the path into an uncritical region.

In accordance with a further embodiment, the cover comprises an at least substantially planar cover surface. An axis of rotation can in particular be oriented perpendicular to a transport plane. The transport plane can in this respect in particular correspond to a horizontal plane in which the transport movers move in the path system. The cover can also in particular be slightly inclined. The cover that is configured as a rotatable disk can at least temporarily have a cut-out for passing a transport mover. A cut-out is, however, in particular not necessary with a carrier that is fastened with the aid of a holder engaging around the disposal apparatus. In this case, the carrier can namely also pass the cover without impediment without a cut-out formed in the cover. If a cut-out is provided in the cover, the transport mover can in particular temporarily open the cut-out, e.g. with the aid of a slider or the like. A wiping apparatus can preferably be provided that is configured to wipe contaminants and/or incorrect portions from the cover. This preferably takes place at the side remote from the path.

In accordance with a further embodiment, the disposal apparatus comprises a stationary cover having a disposal slope leading next to the part region of the path. The disposal apparatus is passive in this case, i.e. it does not actively convey contaminants and/or incorrect portions. The shielding or the protection of part regions at risk of contamination can in this case take place e.g. by a slanted metal sheet. In this respect, the contamination and/or incorrect portions can in particular be disposed of with the aid of gravity. A separate drive is not necessary. The cover can in particular be pivotable and can only dispose of contaminants and/or incorrect portions at times. A cleaning of the cover using a wiper at predefinable time intervals is also conceivable.

A drip edge can preferably be provided at the upper end of the slope and liquids that arise can drip off at it. The cover can in particular be plugged onto the path. A connection can in particular be provided between the cover and the path that is releasable without tools. A clamping connection, plug-in connection, screw connection, latch connection and/or magnetic connection can thus in particular be provided.

In accordance with a further embodiment, the disposal apparatus is configured to move an insertion apparatus serving for the transfer of portions to the transport movers from a transfer position into a disposal position. The disposal device in this respect does not necessarily comprise a separate component, but is rather formed by the insertion apparatus itself. Components and associated costs can be saved in this manner. The insertion apparatus can in particular be pivoted or can be moved at a right angle to the transport direction of the transport movers. The insertion apparatus can in particular comprise a conveyor belt. The insertion apparatus preferably only conveys in the direction of the part region of the path at risk when a transport mover and/or a packaging means, in particular a tray, is/are arranged in the transfer region or when a desired portion has been detected on the insertion apparatus. The insertion apparatus is, however, moved away from the path when contaminants and/or incorrect portions are conveyed. In this case, the insertion apparatus is pivoted, for example, such that the incoming or arriving contaminants and/or incorrect portions are directed into a region, e.g. having a collection container and/or a completing apparatus, next to the path.

In accordance with a further embodiment, the disposal device is configured such that the part region of the path extends next to a disposal region for the contaminants and/or incorrect portions at least at times. The path thus in particular bypasses a region in which increased contamination can occur. The disposal region can in particular be identical to the transfer region for the portions. The insertion apparatus is preferably stationary, i.e. non-pivotable, in this case. The disposal region is thus bypassed by the path. In this case, a fixed path extent can be provided that leaves out the disposal region. Alternatively, a part region of the path can also be moved out of or into the disposal region. If no portions are transferred, the path extent can in this respect at least be interrupted or have a different route. The path can in particular be displaced transversely to the transport direction at least in part regions.

In accordance with a further embodiment, the transport movers each comprise a carrier that protrudes laterally at least at times and that projects into the transfer region. In particular when the path extent leaves out the disposal region, the carrier can nevertheless project into this region to pick up portions. Means can preferably be provided that permit the carrier that is normally arranged centrally to the rotor or to the path to protrude laterally, e.g. when the transport mover moves into the transfer region or into the disposal region. The means can in this respect in particular provide that the carrier is coupled to the associated transport movers and remains on the actual path extent. The carrier can thus be laterally displaced at least temporarily and can subsequently be adjusted back, e.g. for stability reasons, into a central position again.

In accordance with a further embodiment, the disposal device comprises a fan that is configured to blow the contaminants and/or incorrect portion next to the part region. The fan can, for example, be provided before the actual transfer region such that e.g. cutting residues are already removed before a transfer to the transport movers takes place. The transfer region so-to-say keeps itself clean.

The invention also relates to a method of moving portions which each comprise at least one slice cut off from a food product, in particular by means of a slicing apparatus, in particular by means of a high-speed slicer. The portions are moved by means of a plurality of individually movable transport movers which are traveled along at least one predefined path in a path system by means of a control device. At least one part region of the path, in particular a part region at risk of contamination, is protected against the contaminants and/or incorrect portions originating from the foods, in particular arising on the slicing of the food products and/or on the handling of the portions in that the contaminants and/or incorrect portions are disposed of next to the part regions by means of a disposal device at least at times.

All the embodiments of the apparatus described here are in particular configured to be operated in accordance with the method described here. Furthermore, all the embodiments of the apparatus described here as well as all the embodiments of the method described can each be combined with one another.

Figure 2:
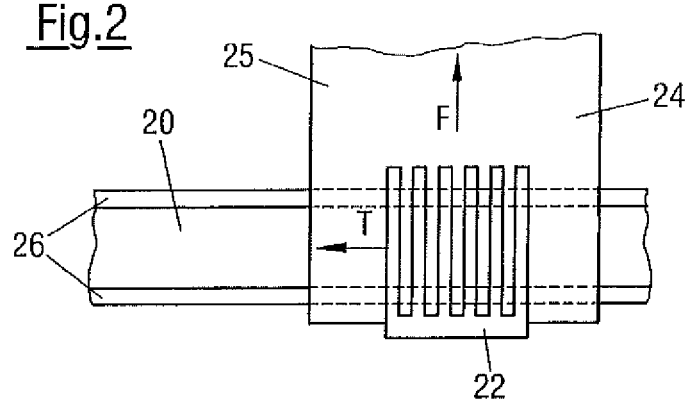
Figure 3:
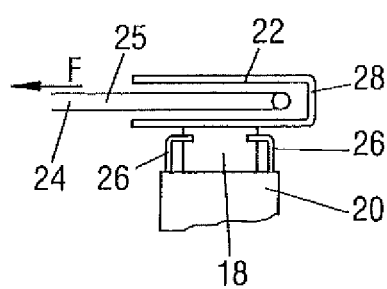
Figure 4:
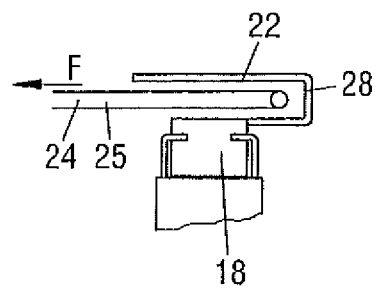
Figure 5:
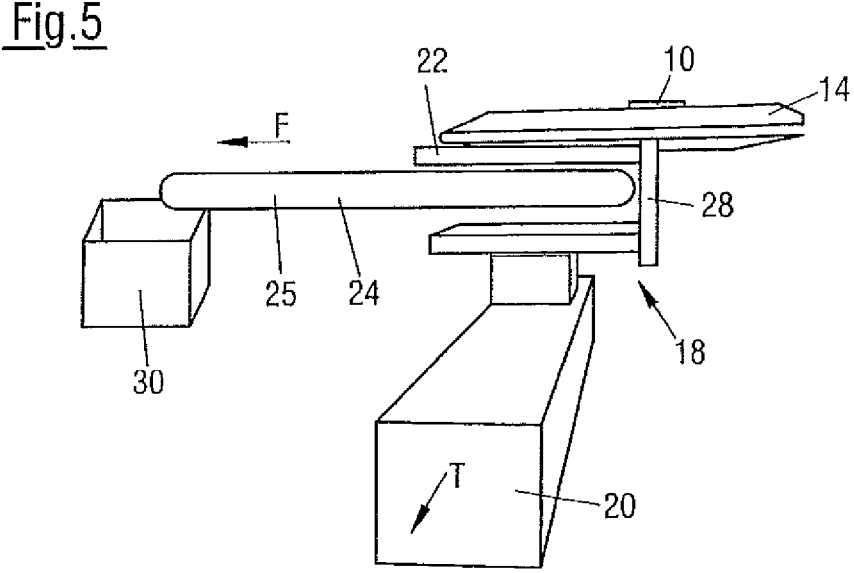
Figure 6:
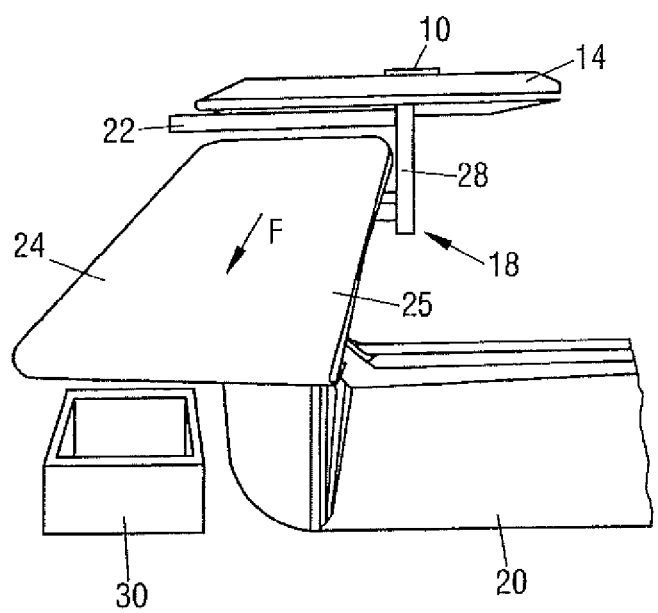
Figure 7:
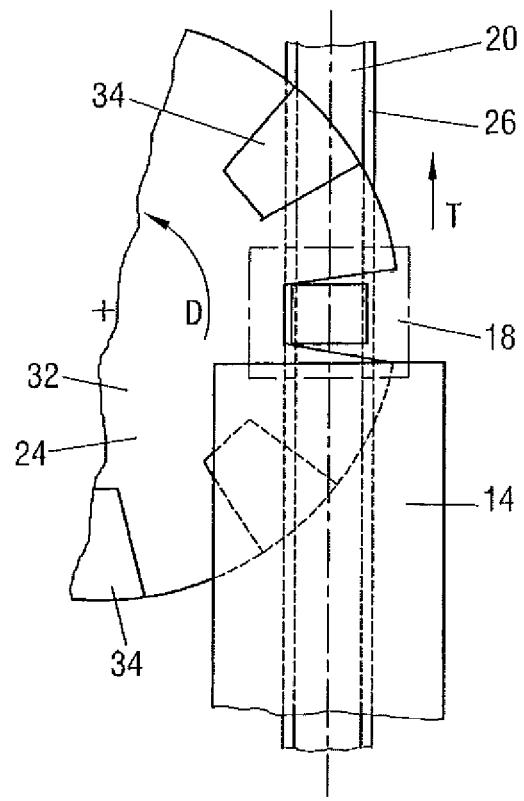
Figure 8:
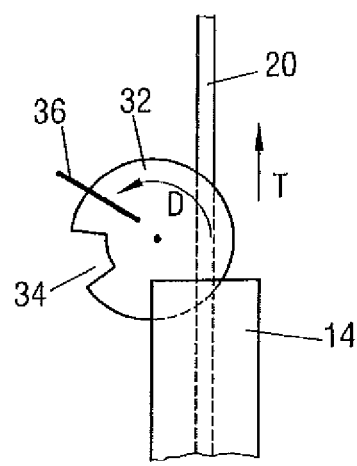
Figure 9:
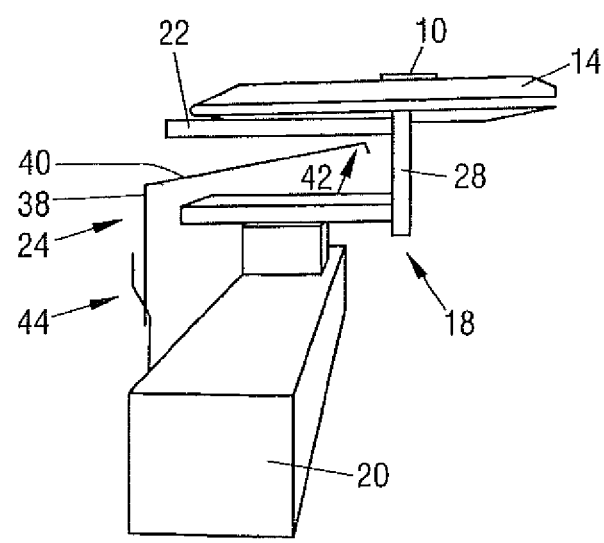
Figure 10:
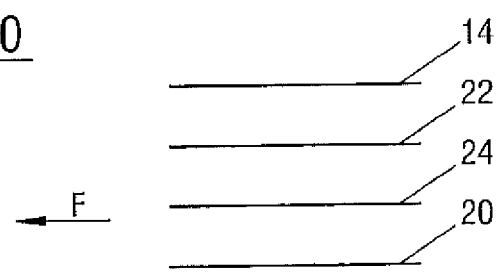
Figure 15:
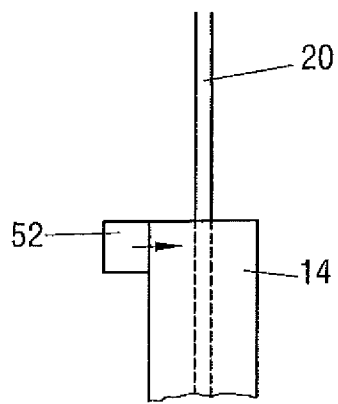
Figure 16:
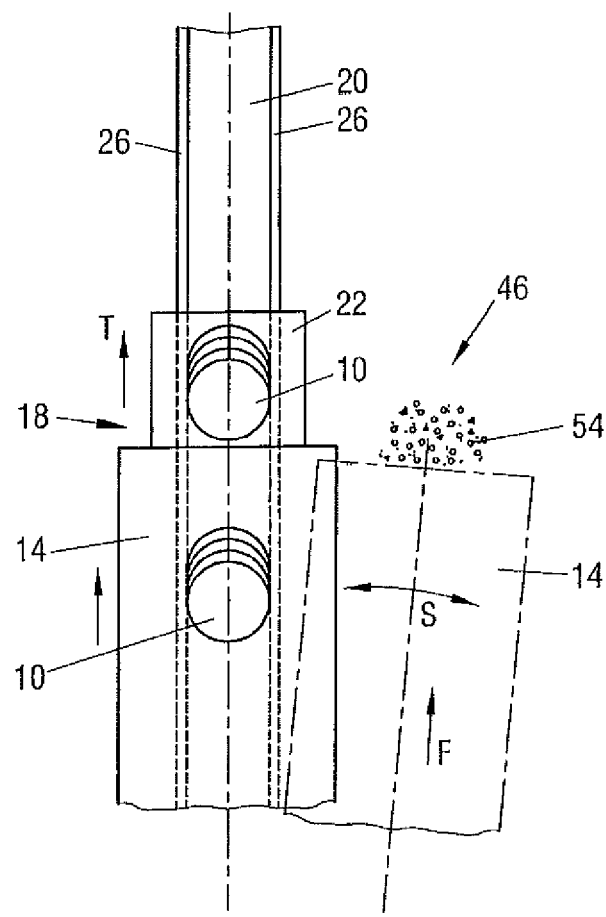
Figure 17:
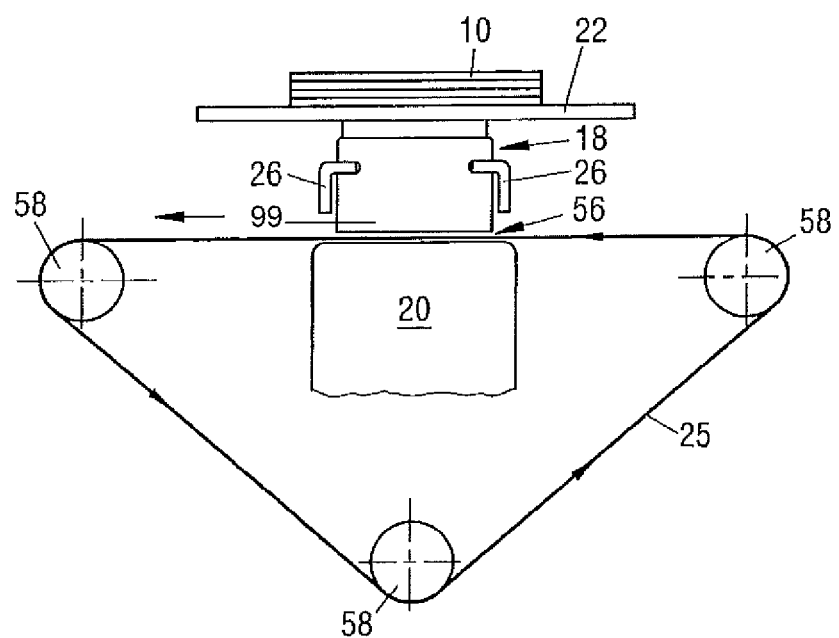

The invention will be described in the following by way of example with reference to the drawings. There are shown:

FIG. 1 a perspective view of an embodiment of a movement apparatus in accordance with the invention;

FIG. 2 a plan view of a part region of the movement apparatus in accordance with FIG. 1;

FIGS. 3 and 4 sectional views of the movement apparatus in accordance with FIG. 2;

FIGS. 5 and 6 perspective views of further embodiments of movement apparatus in accordance with the invention;

FIGS. 7 and 8 plan views of further embodiments of a movement apparatus in accordance with the invention;

FIG. 9 a perspective view of a further embodiment of a movement apparatus in accordance with the invention;

FIG. 10 a schematic side view of a movement apparatus in accordance with the invention;

FIGS. 11 to 16 plan views of further embodiments of a movement apparatus in accordance with the invention; and FIG. 17 a further embodiment of the invention.

It must first be noted that the embodiments shown are of a purely exemplary nature. A plurality of paths can also in particular be arranged next to one another to thus enable a multi-track operation. The features of an embodiment can also be combined as desired with features of another embodiment. Provision can in particular also be made instead of an insertion apparatus that cutting takes place onto the transport movers directly from a slicing apparatus or that portions are placed directly onto the transport movers by a robot device or by hand.

An apparatus for moving portions 10 is shown in FIG. 1. A portion 10 here comprises four slices that are cut-off from a product with the aid of a slicing apparatus, not shown. The slicing apparatus can in particular be a circular blade or a scythe-like blade revolving in planetary motion and/or in a rotational manner. Products can in particular also be sliced in so-called multi-track operation such that portions 10 arise on parallel tracks. The portions 10 are conveyed via conveyor belts 12 to an insertion apparatus 14. The insertion apparatus 14 can in particular be a blade edge belt. A scanner 16 enables a data acquisition for the purpose of cycling the portions 10 in or also for the purpose of expelling them.

The actual movement apparatus adjoins the insertion apparatus 14. It comprises a plurality of transport movers 18 that are moved on a predefined path 20 on a path system. The mover 18 shown here has a carrier 22. This carrier can be formed in the manner of a rake such that portions 10 located thereon can be easily removed by means of a robot gripper likewise configured as a rake.

The transfer region at which the portions 10 are transferred from the insertion apparatus 14 to the transport movers 18 is at particular risk of contamination. There is thus a risk that product residues that arise on the slicing or on the first cutting of product bars move onto the path 20. This is unwanted from hygienic aspects. The freedom of movement of the movers 18 on the path 20 can also be restricted by product residues piling up. A disposal device 24 is provided for this reason that prevents inter alia cutting residues from falling onto the path 20.

A plan view of the movement apparatus is shown in FIG. 2. The disposal device 24 is in this respect configured as a conveyor belt 25 that disposes of product residues laterally next to the path 20 in the conveying direction F. The conveying direction F is in this respect oriented at a right angle to the transport direction T of the movers 18. Contaminants can in this manner be disposed of laterally without them moving onto the path 20 or onto guides 26 of the path 20. The guides 26 can in particular be configured as guide rails for the movers 18.

As can be seen in the sectional views in accordance with FIG. 3 and FIG. 4, a holder 28 of the carrier 22 that is connected to the remaining mover 18 engages around the disposal device 24. Portions 10 can thus be picked up on the carrier 22 of the mover 18 without impediment when the mover 18 is located beneath the insertion apparatus 14. The movers 18 can also be moved freely in the path 20 so that they are not impeded by the disposal device 24.

In the embodiment in accordance with FIG. 3, the carrier 22 and the holder 28 form a "U". This is in particular advantageous when the carrier 22 is of grid shape. The holder 28 is areal in the region beneath the carrier 22 so that product residues falling through the grid are collected by the holder 28.

If the carrier 22 is, in contrast, not configured as a grid, the holder 28 can, as shown in FIG. 4, also only have a substantially vertical component. An areal section that is substantially horizontal beneath the carrier 22 is not necessary in this respect. The carrier 22 and the holder 28 in this respect substantially form an "L".

A perspective view of a movement apparatus is shown in FIG. 5. The disposal device 24 is oriented in this respect such that contaminants and/or incorrect portions are disposed of approximately at a right angle to the transport direction T of the transport movers 18 and are supplied, for example, to a waste container 30.

An embodiment in which the disposal device 24 is arranged in parallel with the path 20 so that the conveying direction F extends in parallel with the transport direction T is shown in FIG. 6. The path 20 in this respect describes a curve such that contaminants and/or incorrect portions are disposed of into the waste container 30 next to the path 20.

In accordance with the embodiments that are shown in FIGS. 7 and 8, the disposal device 24 can also be configured as a rotatable disk 32. The disk 32 forms a cover, has closable cut-outs 34 and can be rotated in the direction of rotation D. The cut-outs 34 can in particular be closed and opened by means of a slider.

If portions are transported off by the transport mover 18, the transport mover 18 impacts the cut-out 34 of the disk 32 and opens it. The transport mover 18 is thus not restricted in its movement. If no portions are conveyed, contaminants in contrast impact regions of the disk 32 that do not have any cut-out 34 or impact closed cut-outs 34. The contaminants are disposed of in the direction of rotation D. The rotational movement of the disk 32 is matched to the movements of the transport movers 18. A control device that is e.g. aware of the positions or speeds of the transport movers 18 and of the angular positions of the cut-outs 34 ensures this.

A variant is shown in FIG. 8, with continued reference to FIGS. 1-6, in which only a single, permanently open cut-out 34 is provided. With a carrier 22 that, together with a holder 28, engages around the disposal device 24, the disk 32 can also be completely closed and not have any cut-out 34. Due to the L-shaped or U-shaped design, the transport mover 18 can also pass the disposal device 24 without impediment in this case.

To remove contaminants and/or incorrect portions from the disk 32, a wiping apparatus 36, for example a deflection meal sheet, can be provided. The wiping apparatus 36 can in particular be passive so that contaminants and/or incorrect portions are removed from the disk 32 due to the rotation thereof.

In accordance with the embodiment that is shown in FIG. 9, the disposal device 24 is configured as a stationary cover 38, e.g. as a passive metal sheet. The metal sheet 38 has a slope 40 so that contaminants or incorrect portions that move onto the metal sheet 38 are disposed of next to the path 20 due to gravity. A drip edge 42 is provided at the upper end of the slope 40.

The metal sheet 38 can be plugged to the path 20 or to a base for the path 20 by means of a plug-in connection 44.

The sequence of the individual planes is shown in FIG. 10. This sequence is generally observed independently of whether the disposal device 24 is active or passive. The plane of the insertion device 14 is at the topmost point, followed by the plane of the carriers 22 in which the portions 10 are transferred or handled. The disposal device 24 is located thereunder. This disposal plane extends above a path plane in which the path 20 having the part regions to be protected is located.

In accordance with the embodiment variant in FIG. 11 to FIG. 13, the path 20 extends next to the insertion apparatus 14. Contaminants and/or incorrect portions thus move into a disposal region 46 while the path 20 bypasses the disposal region 46. To nevertheless be able to pick up portions 10, the carrier 22 can protrude laterally, as shown in FIGS. 11 and 12. The carrier 22 can thus reach into the disposal region 46 to pick up portions 10 coming from the insertion apparatus 14. The path 20 can in this respect extend in parallel with or at a right angle to the insertion apparatus 14.

In accordance with the embodiment shown in FIG. 13, a collection apparatus 48 is provided that can collect carriers 22 from the transport movers 18 and can transport them into the disposal region 46. Once a portion 10 has been picked up, the collection apparatus 48 can return the carrier 22 loaded with a portion 10 back to the transport mover 18 that is thereupon conveyed onward into the path 20. The collection apparatus 48 can thus in particular travel the carriers 22 transversely to the transport direction T.

Figure 14:
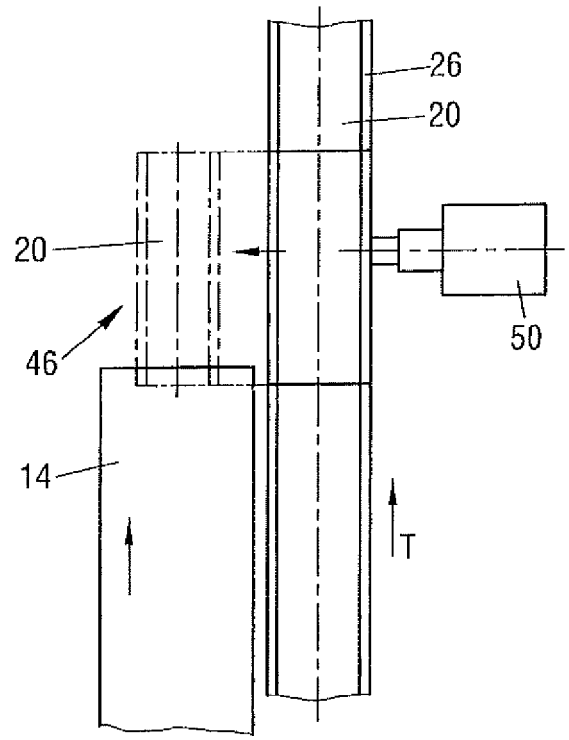

As can be seen in the embodiment in accordance with FIG. 14, a part region of the path 20 can itself also be adjusted at least at times transversely to the transport direction T with the aid of a transverse adjustment device 50 if portions 10 are to be transferred to the transport movers 18. The transverse adjustment device 50 can in particular adjust the path 20 with the aid of a motor, of a spindle and/or of a pneumatic cylinder. If no portions are transferred, the path section 20 is at its normal position such that contaminants and/or incorrect portions move into the disposal region 46 and are thus laterally disposed of next to the path 20.

In accordance with the embodiment shown in FIG. 15, a fan 52 is provided that blows contaminants and/or incorrect portions off the insertion apparatus 14 so that they do not reach the path 20. A compressed air pulse is preferably utilized in this respect.

As can be seen in FIG. 16, the path 20 can also itself be stationary while the insertion apparatus 14 is movable, in particular pivotable. Contaminants 54 are in this respect disposed of laterally from the path 20. If, in contrast, portions 10 are to be transferred to the transport movers 18, the insertion apparatus 14 is pivoted in the pivoting direction S. The portions 10 can thereupon be transferred to the transport movers 18.

In applications in which mostly no portions 10 are transmitted, the insertion apparatus 14 is pivoted outward in the direction of the disposal device 46 most of the time.

In the embodiment shown in FIG. 17, a conveyor belt 25 is provided as the disposal device that is configured as a continuous belt and runs around deflection rollers 58, three deflection rollers here. One of the deflection rollers 58 is configured as a drive roller by which the conveyor belt 25 is moved running counter clockwise in the view of FIG. 17.

In the region of the path 20, the conveyor belt 25 extends in parallel with the transport direction.

The conveyor belt 25 is so thin that it can run through the gap 56 that is present between the transport movers 18 and the path 20 when the transport movers 18 are moved along the path 20.

This gap 56 is in particular present between the lower side of a rotor 99 of the transport mover 18 guided by means of guides 26 of the path system and the upper side of a motor housing of the path 20.

The width of the conveyor belt 25 consequently extends over a part region of the path in which there is in particular an increased risk of contamination. For example, the conveyor belt 25 can be arranged in a portioning region subsequent to a food slicing apparatus and/or in insertion and/or transfer regions for portions 10.

The guides 26 for the transport movers 18 are correspondingly omitted in the region of the conveyor belt 25. For example, sufficient space can be present between vertical holders for these guides 26 at the path 20 or at the mentioned motor housing in order also to be able to lead comparatively wide conveyor belts 25 through.

The conveyor belt 25 preferably lies relatively loosely, but at least substantially areally on the upper side of the path 20 or of the motor housing. If the belt 25 is sufficiently thin, the transport movers 18 can simply be moved beyond the belt 25.

If only two deflection rollers are provided for the conveyor belt 25, provision is preferably made that the upper sides of these deflection rollers are located approximately at the height level of the upper side of the path 20 or of the motor housing. The region to be protected against contaminants is preferably laterally bounded by the deflection rollers. The axes of rotation of the deflection rollers are preferably arranged in parallel with the transport direction. It is alternatively possible that the axes of rotation of the deflection rollers are aligned obliquely to the transport direction. This can be the case, for example, when the contaminants that arise can be grasped better.

If only two deflection rollers are present for the conveyor belt 25, they have a comparatively large diameter to be able to lead the lower run of the conveyor belt beneath the path 20 or beneath the motor housing.

If in contrast—as in the embodiment of FIG. 17—more than two deflection rollers 58 are present, they can have a smaller diameter since it is possible to guide the conveyor belt 25 in any desired manner with more than two deflection rollers 58 and in so doing to bypass construction restrictions.

With respect to the removal of the contaminants transported off from the conveyor belt 25, provision is preferably made to provide corresponding wiping or combing apparatus in the lower region of the conveyor belt, i.e. in the region of the lower run.

It can be prevented in accordance with the invention that contaminants 54 and/or incorrect portions move onto part regions of the path 20. Contaminants 54 and/or incorrect portion can be removed with the aid of the respective disposal apparatus 24 without the transport movers 18 being restricted in their freedom of movement along the path 20.

REFERENCE NUMERAL LIST 10 portion
12 conveyor belt
14 insertion apparatus
16 scanner
18 transport mover
20 path
22 carrier
24 disposal device
25 conveyor belt
26 guide
28 holder
30 waste container
32 disk
34 cut-out
36 wiping apparatus
38 metal sheet
40 slope 42 drip edge
44 plug-in connection
46 disposal region
48 collection apparatus
50 transverse adjustment device
57 fan
54 contamination
56 gap
58 deflection roller
99 Rotor
F conveying direction
T transport direction
D direction of rotation
S pivot direction

The invention claimed is:

1. An apparatus for moving portions that each comprise at least one slice cut off from a food product, the apparatus comprising:
 a plurality of individually movable transport movers for the transport of portions;
 a path system for the transport movers in which the transport movers are movable in a direction of transport along at least one predefined path; and
 a control device for controlling the movements of the transport movers in the path system,
 wherein the transport movers each comprise at least one rotor cooperating with the path system and at least one carrier for portions attached to the rotor;
 wherein a disposal device is provided for at least one part region of the path, the part region at a risk of contamination, the disposal device comprising a disposal apparatus which is provided in addition to the path and which is arranged above the part region of the path, at least at times, and the disposal device is configured to dispose of at least one of contaminants and incorrect portions, originating from the food products on the slicing of the food products and/or on the handling of the arising portions, next to the part region at least at times; and
 wherein the disposal device is provided in a transfer region in which portions move onto the transport movers, and in that the portions are transferred in the transfer region from an insertion apparatus, in particular configured as a conveyor belt or from a slicing apparatus to the transport movers.

2. The apparatus in accordance with claim 1, wherein the transport movers each comprise a holder for their carrier, the holder engaging around the disposal device so that the carrier is arranged above the disposal device.

3. The apparatus in accordance with claim 1, wherein the disposal apparatus is configured for an active disposal of at least one of the contaminants and the incorrect portions.

4. The apparatus in accordance with claim 1, wherein the disposal apparatus is configured to dispose of at least one of the contaminants and the incorrect portions laterally next to the part region of the path with respect to the transport direction.

5. The apparatus in accordance with claim 1, wherein the disposal apparatus comprises a conveying apparatus.

6. The apparatus in accordance with claim 5, wherein the conveying direction of the conveying apparatus extends at a right angle or obliquely to the transport direction.

7. The apparatus in accordance with claim 5, wherein the conveying apparatus comprises a conveyor belt that extends at a right angle or obliquely to the transport direction and through a gap that is present between the path and the rotor in transport operation.

8. The apparatus in accordance with claim 7, wherein the gap is present between a lower side of the rotor and the upper side of a motor housing of the path system.

9. The apparatus in accordance with claim 1, wherein the disposal apparatus comprises a movable cover.

10. The apparatus in accordance with claim 9, wherein the cover is areal and/or of disk shape.

11. The apparatus in accordance with claim 9, wherein the cover comprises an at least substantially planar cover surface.

12. The apparatus in accordance with claim 1, wherein the disposal apparatus comprises a stationary cover having a disposal slope leading next to the part region of the path.

13. The apparatus in accordance with claim 2, wherein the disposal apparatus comprises a stationary cover having a disposal slope leading next to the part region of the path.

14. The apparatus in accordance with claim 1, wherein the disposal device is configured to move an insertion apparatus serving for the transfer of portions to the transport movers from a transfer position into a disposal position.

15. The apparatus in accordance with claim 1, wherein the disposal device is configured such that the part region of the path extends next to a disposal region for at least one of the contaminants and the incorrect portions at least at times.

16. The apparatus in accordance with claim 1, wherein the transport movers each comprise a carrier protruding laterally at least at times and projecting into the transfer region.

* * * * *